(12) United States Patent
Yata et al.

(10) Patent No.: US 7,408,600 B2
(45) Date of Patent: Aug. 5, 2008

(54) LIQUID CRYSTAL DISPLAY DEVICE

(75) Inventors: Tatsuya Yata, Oogaki (JP); Norio Koma, Gifu (JP)

(73) Assignee: Epson Imaging Devices Corporation, Nagano (JP)

( * ) Notice: Subject to any disclaimer, the term of this patent is extended or adjusted under 35 U.S.C. 154(b) by 385 days.

(21) Appl. No.: 11/362,350

(22) Filed: Feb. 27, 2006

(65) Prior Publication Data

US 2006/0221284 A1    Oct. 5, 2006

(30) Foreign Application Priority Data

Mar. 30, 2005   (JP)   ............... 2005-097037

(51) Int. Cl.
*G02F 1/1347* (2006.01)
*G02F 1/1335* (2006.01)

(52) U.S. Cl. .................. 349/75; 349/15; 349/74; 349/76; 349/95; 349/117; 349/119

(58) Field of Classification Search ............ 349/15, 349/75
See application file for complete search history.

(56) References Cited

U.S. PATENT DOCUMENTS 4,957,351 A * 9/1990 Shioji ................ 349/15

2002/0145682 A1 * 10/2002 Kwon et al. .............. 349/15

FOREIGN PATENT DOCUMENTS

| EP | 0-833-183 A1 | 4/1998 |
|---|---|---|
| EP | 1-067-805 A2 | 1/2001 |
| GB | 2-405-543 A | 3/2005 |
| JP | 2004-280042 | 10/2004 |
| TW | 200511862 A | 3/2005 |
| WO | WO 2004/003630 A1 | 1/2004 |

* cited by examiner

Primary Examiner—Michael H Caley
(74) Attorney, Agent, or Firm—Morrison & Foerster LLP (57) ABSTRACT

This invention offers a liquid crystal display device with which each of a plurality of observers can visually recognize each of two different images displayed on a single liquid crystal display panel respectively. The liquid crystal display device of this invention includes a light source for backlighting, a first polarizing plate to extract linearly polarized light from the light source for backlighting, a polarization control LCD composed of a liquid crystal layer divided into a plurality of columns and controlling an optical retardation of each of the plurality of columns, lenticular lenses disposed along the columns, a first retardation plate in which a row having a first optical retardation and a row having another optical retardation that is different from the first optical retardation are disposed alternately, a display LCD and a second and a third polarizing plates between which the display LCD is interposed.

9 Claims, 7 Drawing Sheets

LIQUID CRYSTAL DISPLAY DEVICE

CROSS-REFERENCE OF THE INVENTION

This invention is based on Japanese Patent Application No. 2005-097037, the content of which is incorporated herein by reference in its entirety.

BACKGROUND OF THE INVENTION

1. Field of the Invention

This invention relates to a liquid crystal display device, specifically to a liquid crystal display device capable of displaying a dual picture on a single liquid crystal display panel.

2. Description of the Related Art

A liquid crystal display device using a liquid crystal panel for display (hereafter referred to as a LCD (Liquid Crystal Display)) has been known as a display device incorporated in a TV receiver, an information device, etc. The increased variety of the information devices in recent years requires not only a conventional single picture display but also a dual picture display, with which two different display images can be visually recognized by a plurality of observers separately, and a variety of display modes such as three-dimensional display that realizes stereoscopic view.

Further description on the technologies mentioned above is provided in Japanese Patent Application Publication No. 2004-280042, for example.

However, the development of the liquid crystal display device capable of the dual picture display or having the display mode of the three-dimensional display is not satisfactory yet and further development has been required. Also, there has been a requirement for a development of a liquid crystal display device having a display mode switchable between different display modes such as the dual picture display and the three-dimensional display.

SUMMARY OF THE INVENTION

This invention is directed to respond the requirements described above, and offers a liquid crystal display device having a light source for backlighting, a first polarizing plate that extracts linearly polarized light from the light source, a polarization control liquid crystal device that is made of a liquid crystal layer interposed between a pair of transparent electrodes and divided into a plurality of columns and controls an optical retardation of each column of the liquid crystal layer, lenticular lenses disposed along the column of the liquid crystal layer, a first retardation plate that is divided into a plurality of rows that is composed of alternatively disposed first rows having a first optical retardation and second rows having another optical retardation that is different from the first optical retardation, a liquid crystal panel for display and second and third polarizing plates between which the liquid crystal panel for display is interposed.

The polarization control liquid crystal device operates in a vertical alignment mode and is provided with a second retardation plate on its front surface and a third retardation plate on its back surface, both having a second optical retardation. Or, the polarization control liquid crystal device operates in an electrically controlled birefringence) mode and is provided on its back surface with the second retardation plate having the second optical retardation that is equal to an optical retardation caused when a voltage is applied to the liquid crystal layer.

DETAILED DESCRIPTION OF THE INVENTION

Figure 1:
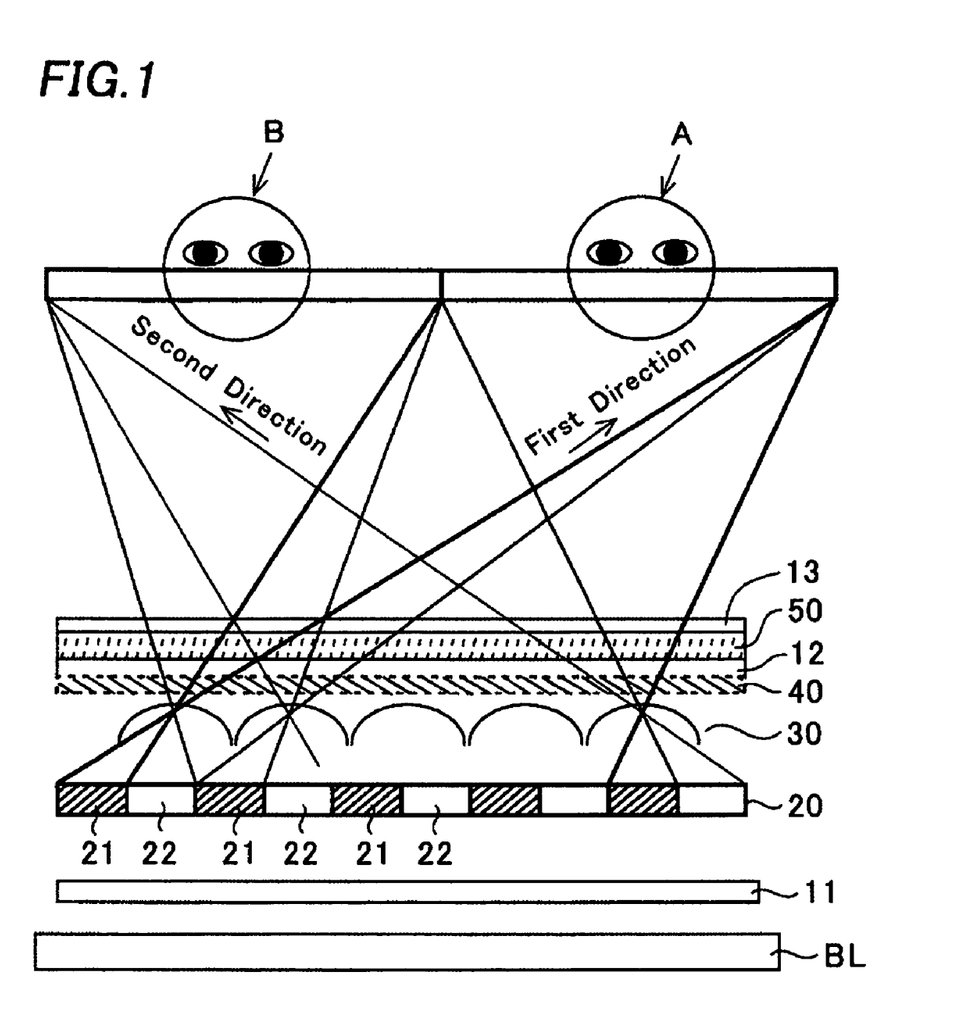
FIG. 1 is a cross-sectional view showing a liquid crystal display device according to a first embodiment of this invention.
Figure 2:
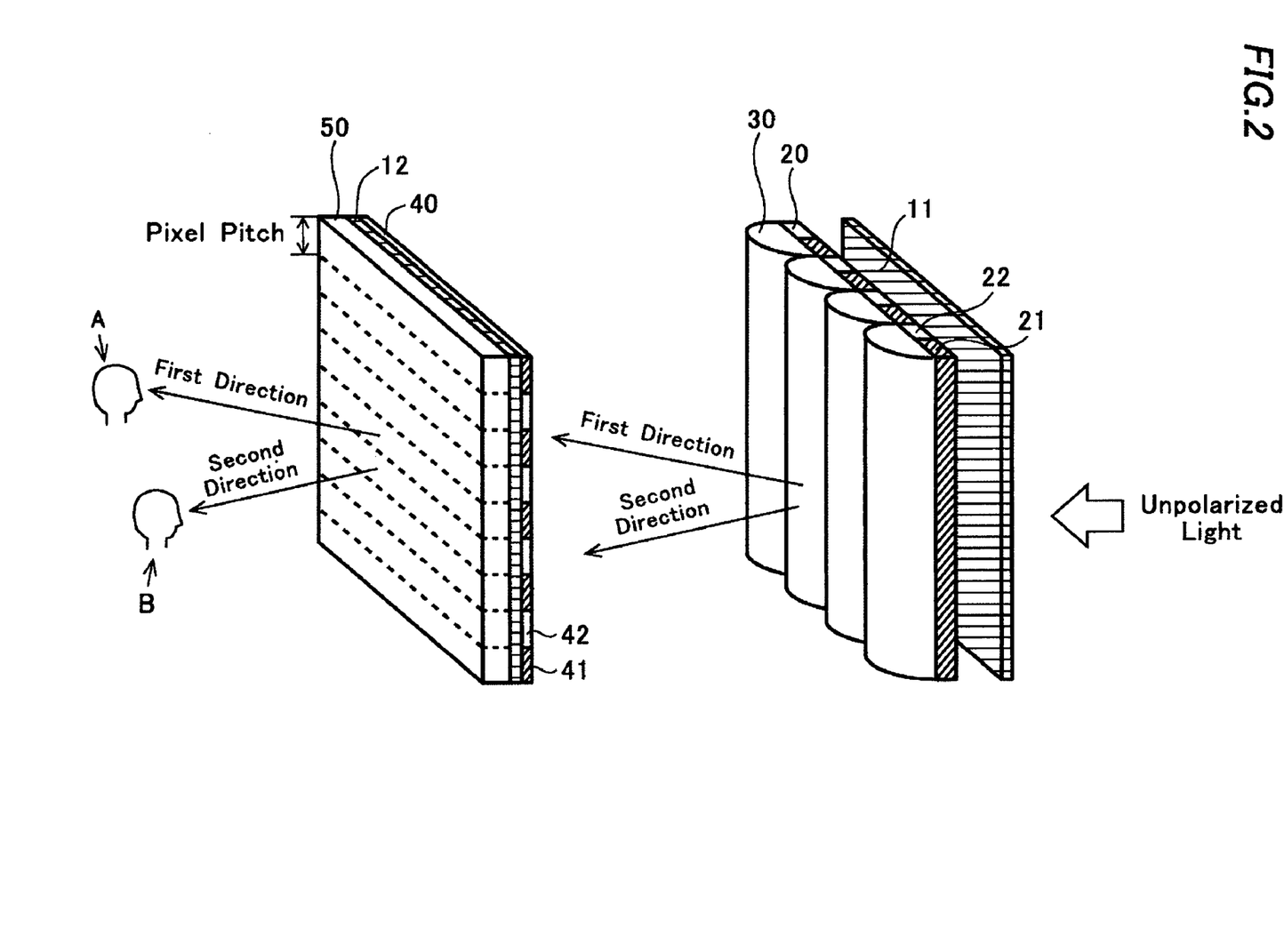
FIG. 2 is an oblique perspective view showing the liquid crystal display device according to the first embodiment of this invention.
Figure 3A:
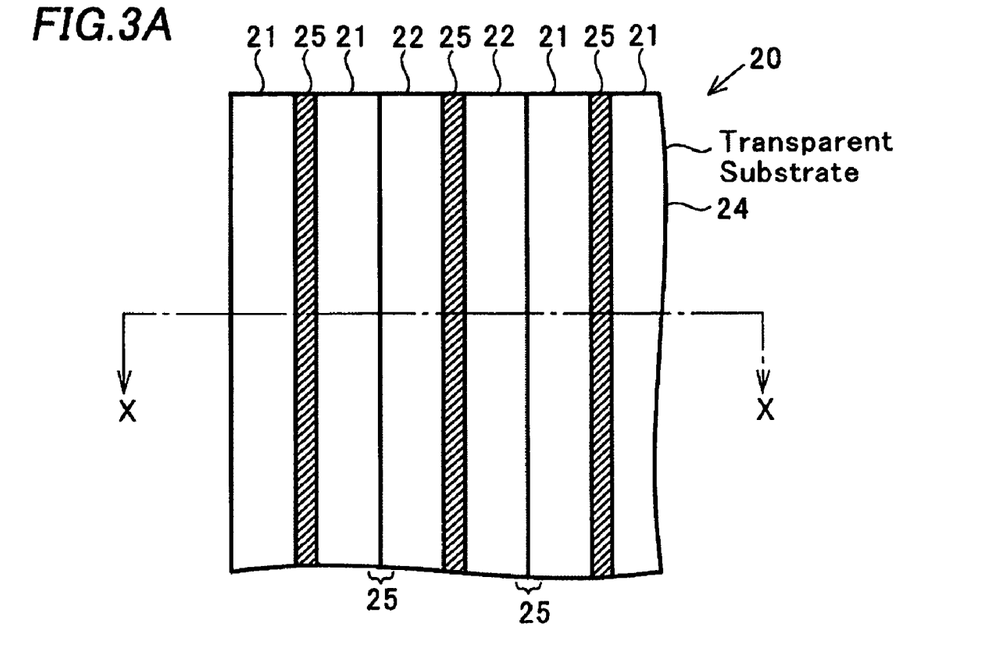
FIG. 3A is a plan view showing the liquid crystal display device according to the first embodiment of this invention.
Figure 3B:
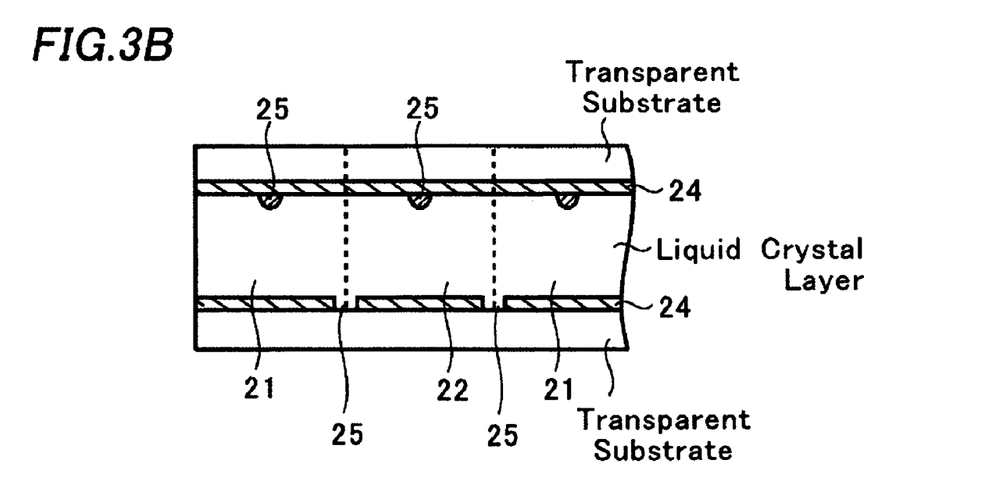
FIG. 3B is a cross-sectional view showing a section X-X in FIG. 3A.
Figure 4:
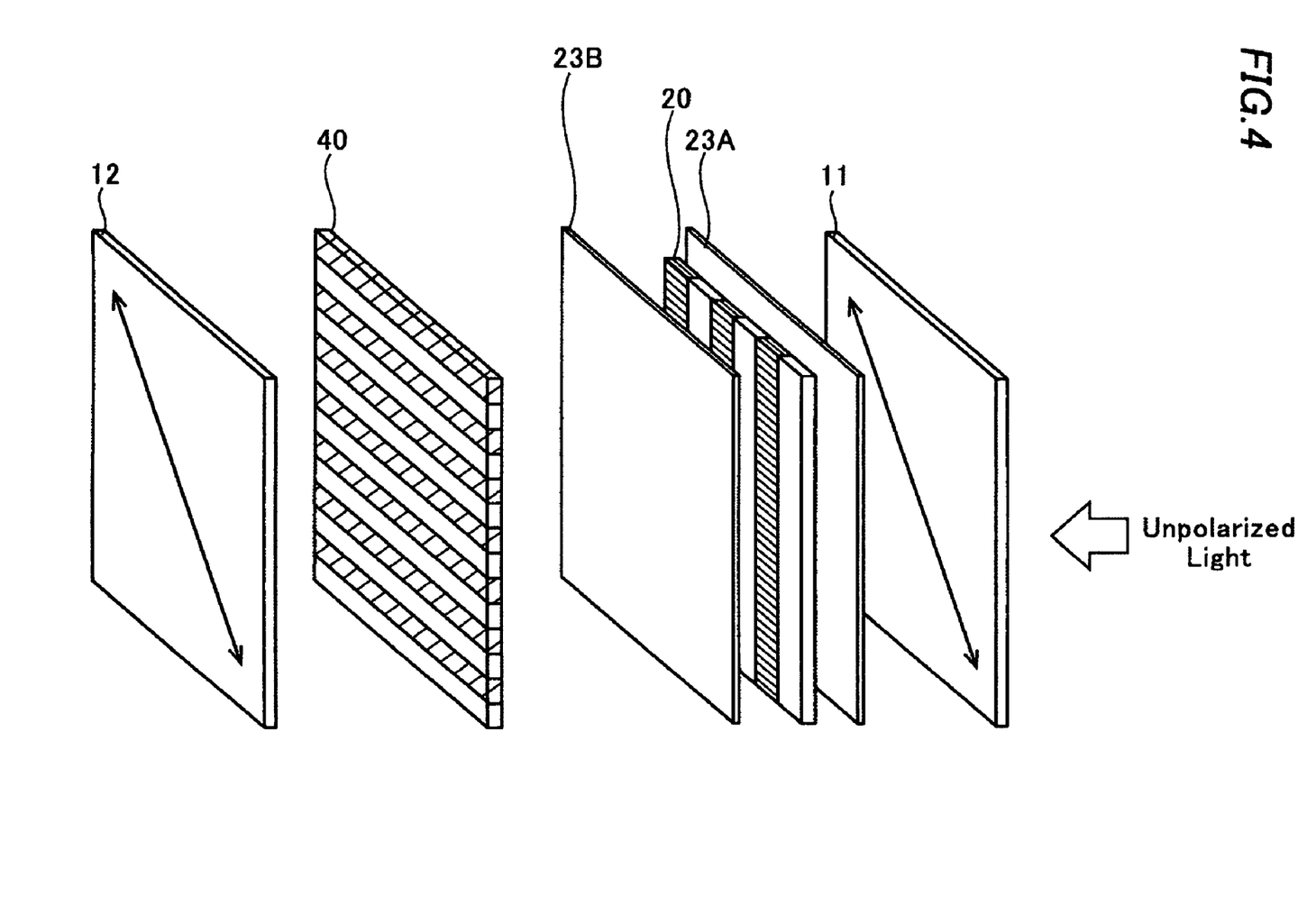
FIG. 4 is an oblique perspective view showing the liquid crystal display device according to the first embodiment of this invention.

Next, a liquid crystal display device according to a first embodiment of this invention will be explained referring to the drawings. FIG. 1 is a cross-sectional view showing the liquid crystal display device according the embodiment. FIG. 2 and FIG. 4 are oblique perspective views showing the liquid crystal display device according to the embodiment. FIG. 3A is a plan view showing a polarization control LCD 20 of the liquid crystal display device according the embodiment, and FIG. 3B is a cross-sectional view showing a section X-X in FIG. 3A. Note that a second retardation plate 23A and a third retardation plate 23B are omitted in FIGS. 1 and 2 and that a third polarizing plate 13 is omitted in FIG. 2. The second retardation plate 23A and the third retardation plate 23B are described below with reference to FIG. 4. Also, the third polarizing plate 13, lenticular lenses 30 and a display LCD 50 are omitted from the structure shown in FIG. 4.

A first polarizing plate 11, that extracts linearly polarized light from unpolarized light of a light source BL for backlighting, faces the light source BL, as shown in FIG. 1 and FIG. 2. The polarization control LCD 20, that controls an angle of a polarization axis (an angle of a polarization axis on a plane perpendicular to a traveling direction of the linearly polarized light) of the linearly polarized light extracted by the first polarizing plate 11 through an optical retardation, is placed on an observer-side of the first polarizing plate 11.

The polarization control LCD 20 is made of a liquid crystal layer that is interposed between a pair of transparent electrodes 24 and is used in a VA (Vertical Alignment) mode. The liquid crystal layer is composed of a first liquid crystal portion 21 and a second liquid crystal portion 22 that are divided into a plurality of columns. The first liquid crystal portion 21 and the second liquid crystal portion 22 are controlled by a control circuit (not shown) that determines whether or not to apply a voltage to the pair of transparent electrodes 24 so as to cause a predetermined optical retardation by liquid crystal molecules. Assuming that a wavelength of the incident linearly polarized light is $\lambda$, the predetermined optical retardation is $\lambda/2$, for example, and rotates the polarization axis of the incident linearly polarized light by 90 degrees.

The vertically aligned liquid crystal molecules are required to be inclined at a predetermined angle so as to be aligned in a specific direction when the voltage is applied. The predetermined angle is preferably given by alignment control portions 25 made of projections or slits formed on or in at least one of the pair of transparent electrodes 24 (formed on a pair of transparent substrates), as shown in FIG. 3A and in FIG. 3B that is a cross-sectional view of a section X-X in FIG. 3A. Or the predetermined angle may be given by other alignment processing.

The lenticular lenses 30, that have continuous convex surfaces along each column of the first liquid crystal portion 21 and the second liquid crystal portion 22, are placed on the observer-side of the polarization control LCD 20. The lenticular lenses 30 refract each of the linearly polarized light, which has different angles of polarization axis varying according to the first and the second liquid crystal portions 21 and 22, in the first direction toward a first observer A and the second direction toward a second observer B, respectively.

A first retardation plate 40 is placed at a location facing the lenticular lenses 30. The first retardation plate 40 is divided into a plurality of rows that are made of first rows 41 (odd-numbered rows, for example) with a first optical retardation and second rows 42 (even-numbered rows, for example) with an optical retardation that is different from the first optical retardation. In this embodiment, the first and second rows are arranged alternatively. The first rows 41 and the second rows 42 are formed so that a polarization axis of a linearly polarized light from each of the first rows 41 is perpendicular to a polarization axis of a linearly polarized light from each of the second rows 42. For example, the first optical retardation assigned to the first rows 41 may be $\lambda/2$ and the optical retardation assigned to the second rows 42 and different from the first optical retardation may be zero. The first retardation plate 40 is bonded to the display LCD 50 that is interposed between a second polarizing plate 12 and the third polarizing plate 13 (not shown in FIG. 2).

The second polarizing plate 12 has the same angle (45 degrees, for example) of polarization axis as the first polarizing plate 11. And the third polarizing plate 13 is arranged in a cross Nicol arrangement (an arrangement in which polarization axes of a pair of polarizing plates intersect perpendicular to each other) with the second polarizing plate 12. In this embodiment, the pixel pitch of display pixels in the display LCD 50 coincides with the distance between the first row 41 and the second row 42 adjacent to each other in the first retardation plate 40.

Additionally in this embodiment, each of the second retardation plate 23A and the third retardation plate 23B, both of which have a second optical retardation, is placed respectively on both surfaces of the polarization control LCD 20 in the structure described above, as shown in FIG. 4. The second optical retardation is $\lambda/4$, when the wavelength of the linearly polarized light extracted from the light source BL for backlighting is $\lambda$. That is, each of the second retardation plate 23A and the third retardation plate 23B has a slow axis that deviates by 45 degrees from a transmission axis (polarization axis) of the first polarizing plate 11. The slow axis of the second retardation plate 23A and the slow axis of the third retardation plate 23B intersect perpendicular to each other.

Figure 5:
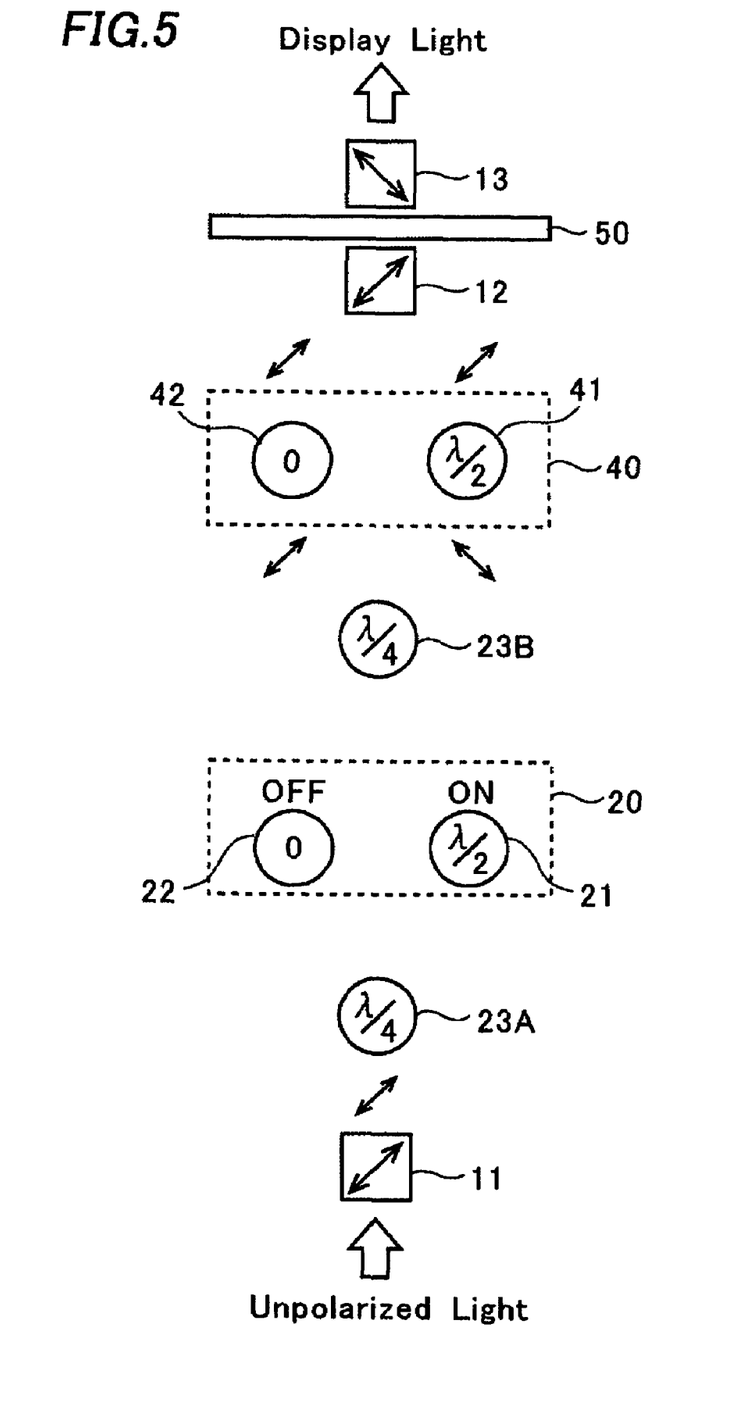
FIG. 5 is a conceptual illustration showing operation of the liquid crystal display device according to the first embodiment of this invention.

Next, an operation of the liquid crystal display device according to the embodiment will be explained referring to the drawings. FIG. 5 is a conceptual illustration showing the operation of the liquid crystal display device according to the embodiment.

First, the linearly polarized light is extracted from the omni-directional light of the light source BL for backlighting by the first polarizing plate 11, as shown in FIG. 5. The linearly polarized light is changed into a circularly polarized light by passing through the second retardation plate 23A, the slow axis of which is aligned 45 degrees to the transmission axis (polarization axis) of the first polarizing plate 11, and goes into the polarization control LCD 20. The polarization axis of the incident light to the first liquid crystal portion 21 having the predetermined optical retardation of $\lambda/2$ is rotated by 90 degrees by the optical retardation described above. The light from the liquid crystal layer goes into the third retardation plate 23B having the slow axis that is perpendicular to the slow axis of the second retardation plate 23A and is changed into a linearly polarized light again before going out of the third retardation plate 23B.

That is, the polarization axis becomes perpendicular to the polarization axes of the first and the second polarizing plates 11 and 12. On the other hand, the linearly polarized incident light to the second liquid crystal portion 22, to which no voltage is applied to cause the optical retardation, goes out of the second liquid crystal portion 22 keeping its polarization axis intact. That is, the polarization axis maintains the same angle as the angle of the polarization axes of the first and the second polarizing plates 11 and 12.

Unnecessary optical retardation caused in the polarization control LCD 20 by birefringence can be removed in the process by the second and the third retardation plates 23A and 23B described above, thus good transmission characteristics can be obtained even when an alignment direction of the liquid crystal molecules in the liquid crystal layer is not uniform.

Next, the two kinds of linearly polarized light from the polarization control LCD 20, which are different from each other in the optical retardation, are refracted in two different directions (the first direction and the second direction) when they travel through the lenticular lenses 30 (not shown in FIG. 5) and then go into the first retardation plate 40.

The two kinds of linearly polarized light traveling through the first rows 41 (odd-numbered rows, for example) with the first optical retardation $\pi/2$ out of the plurality of rows in the first retardation plate 40 go into the second polarizing plate 12 after their polarization axes are rotated by 90 degrees. Out of the two different kinds of linearly polarized light, the linearly polarized light in the first direction that has traveled through the first liquid crystal portion 21 in the polarization control LCD 20 has the polarization axis of the same angle as the polarization axis of the second polarizing plate 12, thus it passes through the second polarizing plate 12 and goes into the display LCD 50. On the other hand, the linearly polarized light in the second direction that has traveled through the second liquid crystal portion 22 has the polarization axis perpendicular to the polarization axis of the second polarizing plate 12, thus it does not pass through the second polarizing plate 12 and does not go into the display LCD 50.

And the two kinds of linearly polarized light traveling through the second rows 42 (even-numbered rows, for example) with no optical retardation (or with an optical retardation different from the first optical retardation) out of the plurality of rows in the first retardation plate 40 go into the second polarizing plate 12 keeping their polarization axes intact. Out of the two different kinds of linearly polarized light, the linearly polarized light in the first direction that has traveled through the first liquid crystal portion 21 in the polarization control LCD 20 has the polarization axis perpendicular to the polarization axis of the second polarizing plate 12, thus it does not pass through the second polarizing plate 12 and does not go into the display LCD 50. On the other hand, the linearly polarized light in the second direction that has traveled through the second liquid crystal portion 22 in the polarization control LCD 20 has the polarization axis of the same angle as the polarization axis of the second polarizing plate 12, thus it passes through the second polarizing plate 12 and goes into the display LCD 50.

At that time, the driving of a plurality of display pixels in rows (odd-numbered rows, for example) of the display LCD 50, which correspond to the first rows 41 of the first retardation plate 40, is controlled by the control circuit (not shown) according to a first display image. And the driving of a plurality of display pixels in rows (even-numbered rows, for example) of the display LCD 50, which correspond to the second rows 42, is controlled according to a second display image.

The linearly polarized light in the first direction that has passed through the first rows 41 of the first retardation plate 40 passes through the plurality of display pixels in the rows (odd-numbered rows, for example) of the display LCD 50 corresponding to the first rows 41, and let the first observer A visually recognize only the first display image. And the linearly polarized light in the second direction that has passed through the second rows 42 passes through the plurality of display pixels in the rows (even-numbered rows, for example) of the display LCD 50 corresponding to the second rows 42, and let the second observer B visually recognize only the second display image. Each of the two different display images can be visually recognized from each of the first and second directions, respectively, on a single display LCD 50 as easily understood by a person skilled in the art from the explanation given above. In this embodiment, the first liquid crystal portion 21 and the second liquid crystal portion 22 in the polarization control LCD 20 is used in the VA mode.

Figure 6:
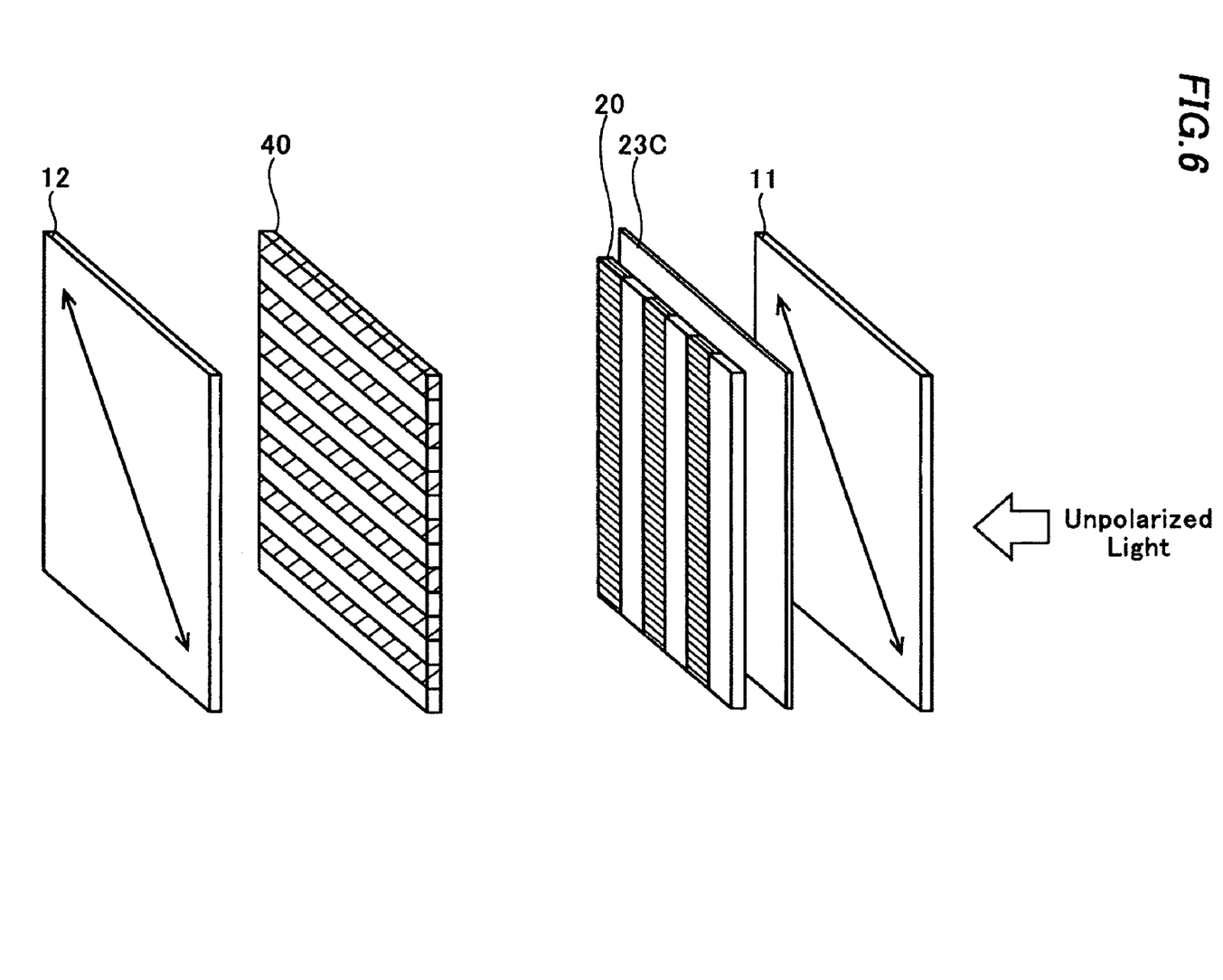
FIG. 6 is an oblique perspective view showing a liquid crystal display device according to a second embodiment of this invention.

A second embodiment of this invention will be explained referring to the drawings. FIG. 6 is an oblique perspective view showing a liquid crystal display device according to the second embodiment. Note that the third polarizing plate 13, the lenticular lenses 30 and the display LCD 50 are omitted and not shown in FIG. 6.

The first liquid crystal potion 21 and the second liquid crystal portion 22 in the polarization control LCD 20 are used in an ECB (Electrically Controlled Birefringence) mode in the liquid crystal display device of the second embodiment. Although an optical retardation R caused in the first liquid crystal portion 21 is arbitrary, it is $\lambda/4$ in this embodiment. Likewise, the optical retardation caused in the second liquid crystal portion 22 is $R+\lambda/2$. The alignment control portions 25 as shown in FIG. 3 are not necessarily formed on or in the transparent electrodes (not shown in FIG. 6) on the first liquid crystal portion 21 and the second liquid crystal portion 22.

The rest of the structure is the same as in the first embodiment shown in FIG. 1 and FIG. 2.

Explanation is given assuming that the first rows 41 of the first retardation plate 40 are even-numbered rows and the second rows 42 are odd-numbered rows. The first rows 41 and the second rows 42 are formed so that the polarization axis of the linearly polarized light from each of the first rows 41 is perpendicular to the polarization axis of the linearly polarized light from each of the second rows 42, as in the first embodiment.

A fourth retardation plate 23C is placed on the first polarizing plate 11-side of the polarization control LCD 20, as shown in FIG. 6. The fourth retardation plate 23C has the same optical retardation as the optical retardation R that the first liquid crystal portion 21 has.

Figure 7:
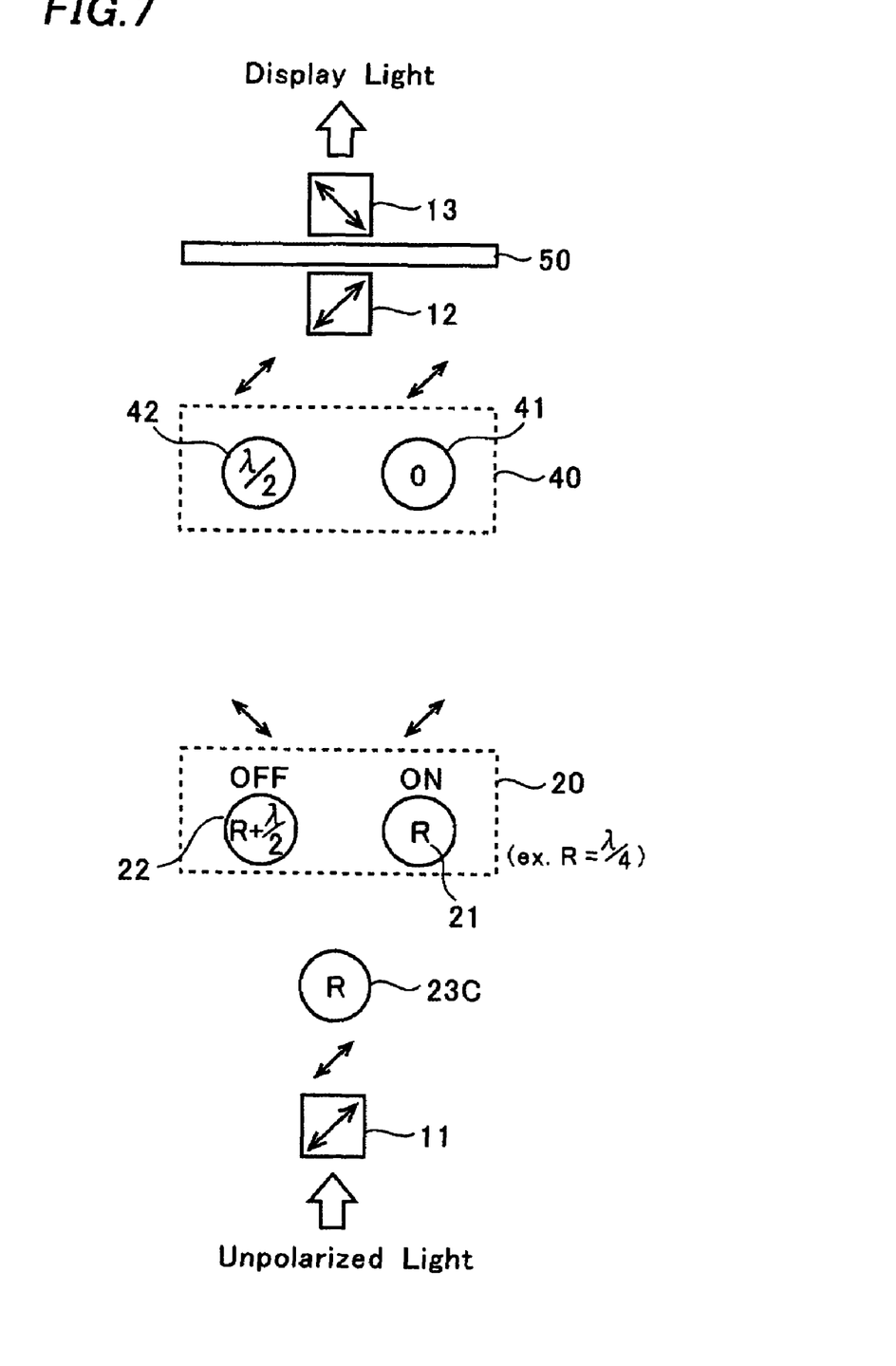
FIG. 7 is a conceptual illustration showing operation of the liquid crystal display device according to the second embodiment of this invention.

Next, an operation of the liquid crystal display device according to the second embodiment will be explained referring to the drawings. FIG. 7 is a conceptual illustration showing the operation of the liquid crystal display device according to the second embodiment.

First, the linearly polarized light is extracted from the unpolarized light of the light source BL for backlighting by the first polarizing plate 11, as shown in FIG. 7. The linearly polarized light goes into the fourth retardation plate 23C where its polarization axis is rotated corresponding to the optical retardation R (changed into a circularly polarized light when $R=\lambda/4$), and goes into the polarization control LCD 20. An angle of the polarization axis of the circularly polarized light incident to the first liquid crystal portion 21 in the polarization control LCD 20 is rotated through its optical retardation $R=\lambda/4$ to become equal to the angle of the polarization axes of the first and the second polarizing plates 11 and 12. On the other hand, the polarization axis of the circularly polarized light incident to the second liquid crystal portion 22 in the polarization control LCD 20 is further rotated by 90 degrees through its optical retardation $R+\lambda/2$ to become perpendicular to the polarization axes of the first and the second polarizing plates 11 and 12.

In this process, unnecessary optical retardation due to the birefringence caused in the polarization control LCD 20 can be removed by the fourth retardation plate 23C described above.

Next, the two kinds of linearly polarized light from the polarization control LCD 20, that are different from each other in the optical retardation, are refracted in two different directions (the first direction and the second direction) when they travel through the lenticular lenses 30 (not shown in FIG. 7) and then go into the first retardation plate 40.

The two kinds of linearly polarized light traveling through the first rows 41 (even-numbered rows, for example) with no optical retardation (or with an optical retardation different from the first optical retardation) out of the plurality of rows in the first retardation plate 40 go into the second polarizing plate 12 keeping their polarization axes intact. Out of the two different kinds of linearly polarized light, the linearly polarized light in the first direction that has traveled through the first liquid crystal portion 21 in the polarization control LCD 20 has the polarization axis of the same angle as the polarization axis of the second polarizing plate 12, thus it passes through the second polarizing plate 12 and goes into the display LCD 50. On the other hand, the linearly polarized light in the second direction that has traveled through the second liquid crystal portion 22 in the polarization control LCD 20 has the polarization axis perpendicular to the polarization axis of the second polarizing plate 12, thus it does not pass through the second polarizing plate 12.

And the two kinds of linearly polarized light traveling through the second rows 42 (odd-numbered rows, for example) with the first optical retardation $\lambda/2$ out of the plurality of rows in the first retardation plate 40 go into the second polarizing plate 12 after their polarization axes are rotated by 90 degrees. Out of the two different kinds of linearly polarized light, the linearly polarized light of the first direction that has traveled through the first liquid crystal portion 21 in the polarization control LCD 20 has the polarization axis perpendicular to the polarization axis of the second polarizing plate 12, thus it does not pass through the second polarizing plate 12. On the other hand, the linearly polarized light of the second direction that has traveled through the second liquid crystal portion 22 has the polarization axis of the same angle as the polarization axis of the second polarizing plate 12, thus it passes through the second polarizing plate 12 and goes into the display LCD 50.

At that time, the driving of the plurality of display pixels in the rows (even-numbered rows, for example) of the display LCD 50, which correspond to the first rows 41 of the first retardation plate 40, is controlled by the control circuit (not shown) according to the first display image. And the driving of the plurality of display pixels in the rows (odd-numbered rows, for example) of the display LCD 50, which correspond to the second rows 42, is controlled according to the second display image.

The linearly polarized light in the first direction that has passed through the first rows 41 of the first retardation plate 40 passes through the plurality of display pixels in the rows (even-numbered rows, for example) of the display LCD 50 corresponding to the first rows 41, and let the first observer A visually recognize only the first display image. The linearly polarized light in the second direction that has passed through the second rows 42 passes through the plurality of display pixels in the rows (odd-numbered rows, for example) of the display LCD 50 corresponding to the second rows 42, and let the second observer B visually recognize only the second display image. Each of the two different display images can be visually recognized from each of the first and second directions, respectively, on a single display LCD 50 as described above.

The traveling directions of the linearly polarized light, i.e. the first and second directions can be changed arbitrarily as required, by adjusting a relative location of the lenticular lenses 30 to the polarization control LCD 20 in the first and second embodiments described above. Furthermore, a three-dimensional display mode can be realized by adjusting each of the first and second directions to each of left and right eyes of a single observer, respectively, and displaying each of two images for stereoscopic views in each of the odd-numbered and even-numbered rows in the display LCD 50, respectively.

When it is necessary, it is possible that only one observer visually recognizes a two-dimensional image by determining whether or not to apply the voltage so that both the first and second liquid crystal portions 21 and 22 have the same optical retardation and the linearly polarized light travels only in a single direction.

Also as the need arises, a viewing angle of the display LCD 50 in each of the display modes described above can be extended by disposing an optical compensation film (not shown), that has optical retardation to extend the viewing angle, on the third polarizing plate 13 or on the display LCD 50.

Two different images each required by each of two observers can be displayed on a single liquid crystal display panel and each of the images can be visually recognized by each of the observers according to the liquid crystal display device of the embodiments. As a result, the efficiency of information transmission by display images can be enhanced.

In addition to the dual picture display as described above, the liquid crystal display device enables switching between a display mode to show a two-dimensional picture and a display mode to show a three-dimensional picture by controlling the polarization control LCD and adjusting the location of the lenticular lenses.

What is claimed is:

1. A liquid crystal display device comprising:
   a light source;
   a first polarizing plate disposed over the light source;
   a polarization control liquid crystal device comprising a liquid crystal layer interposed between a pair of transparent electrodes and divided into a plurality of stripe portions arranged in a first direction, the polarization control liquid crystal device being disposed over the first polarization plate and controlling an optical retardation of each of the stripe portions;
   an array of lenticular lenses disposed over the polarization control liquid crystal device so that lenticular lenses are arranged in the first direction;
   a first retardation plate disposed over the array of lenticular lenses and comprising a first stripe portions arranged in a second direction having a first optical retardation and a second stripe portions arranged in the second direction having a second optical retardation that is different from the first optical retardation, the first and second strip portions being arranged alternately;
   a liquid crystal panel disposed over the first retardation plate;
   a second polarizing plate and a third polarizing plate between which the liquid crystal panel is disposed;
   a second retardation plate having a third optical retardation and disposed between the first polarizing plate and the polarization control liquid crystal device; and
   a third retardation plate having the third optical retardation and disposed between the polarization control liquid crystal device and the first retardation plate.

2. The liquid crystal display device of claim 1, wherein under a vertical alignment mode the polarization control liquid crystal device is configured to apply no voltage to a half of the stripe potions thereof and apply to another half of the stripe portions thereof a voltage corresponding to an optical retardation of a half of a wavelength of light produced by the light source, and the third optical retardation of the second retardation plate is a fourth of the wavelength of the light.

3. The liquid crystal display device of claim 2, further comprising an alignment control portion that controls an alignment of liquid crystal molecules in the liquid crystal layer and is disposed on one of the pair of transparent electrodes.

4. The liquid crystal display device of claim 1, wherein the array of lenticular lenses is positioned so that one type of polarized light is directed to a predetermined direction that is above the liquid crystal panel.

5. The liquid crystal display device of claim 1, further comprising an optical compensation film to extend a viewing angle and disposed on a surface of the liquid crystal panel or on a surface of the second or third polarizing plate.

6. A liquid crystal display device comprising:
   a light source;
   a first polarizing plate disposed over the light source;
   a polarization control liquid crystal device comprising a liquid crystal layer interposed between a pair of transparent electrodes and divided into a plurality of stripe portions arranged in a first direction, the polarization control liquid crystal device being disposed over the first polarization plate and controlling an optical retardation of each of the stripe portions;
   an array of lenticular lenses disposed over the polarization control liquid crystal device so that lenticular lenses are arranged in the first direction;
   a first retardation plate disposed over the array of lenticular lenses and comprising a first stripe portions arranged in a second direction having a first optical retardation and a second stripe portions arranged in the second direction having a second optical retardation that is different from the first optical retardation, the first and second strip portions being arranged alternately;
   a liquid crystal panel disposed over the first retardation plate;

a second polarizing plate and a third polarizing plate between which the liquid crystal panel is disposed; and a second retardation plate having a third optical retardation and disposed between the first polarizing plate and the first retardation plate.

7. The liquid crystal display device of claim 6, wherein under an electrically controlled birefringence mode the polarization control liquid crystal device is configured to apply to a half of the stripe potions thereof no voltage so as to induce an optical retardation of a half of a wavelength of light generated by the light source and apply to another half of the stripe portions thereof a voltage corresponding to another retardation of the light, and the third optical retardation of the second retardation plate is the same as the another retardation.

8. The liquid crystal display device of claim 6, wherein the array of lenticular lenses is positioned so that one type of polarized light is directed to a predetermined direction that is above the liquid crystal panel.

9. The liquid crystal display device of claim 6, further comprising an optical compensation film to extend a viewing angle and disposed on a surface of the liquid crystal panel or on a surface of the second or third polarizing plate.

* * * * *